US007587546B2

United States Patent
Itagaki et al.

(10) Patent No.: US 7,587,546 B2
(45) Date of Patent: *Sep. 8, 2009

(54) DEVICE, METHOD, AND PROGRAM PRODUCT FOR CONTROLLING A TAPE DATA STORAGE DRIVE

(75) Inventors: Hiroshi Itagaki, Yokohama (JP); Takashi Katagiri, Sagamihara (JP); Hirokazu Nakayama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,595

(22) Filed: Nov. 14, 2007

(65) Prior Publication Data

US 2008/0071965 A1  Mar. 20, 2008

Related U.S. Application Data (63) Continuation of application No. 11/349,317, filed on Feb. 7, 2006, now Pat. No. 7,385,776.

(30) Foreign Application Priority Data

Feb. 8, 2005 (JP) ............................. 2005-032076

(51) Int. Cl.
*G06F 12/00* (2006.01)
*G11B 5/58* (2006.01)
(52) U.S. Cl. ........................................ 711/4; 360/72.1
(58) Field of Classification Search ...................... None
See application file for complete search history.

(56) References Cited

U.S. PATENT DOCUMENTS

| | | | | |
|---|---|---|---|---|
| 6,426,842 B1 * | 7/2002 | Kikuchi | ...................... | 360/72.2 |
| 6,525,894 B1 * | 2/2003 | Nakamura | .................... | 360/49 |
| 6,570,729 B1 * | 5/2003 | Takayama | .................... | 360/69 |
| 7,103,741 B2 * | 9/2006 | Kato et al. | .................. | 711/163 |

* cited by examiner

*Primary Examiner*—K. Wong
(74) *Attorney, Agent, or Firm*—Dillon & Yudell LLP (57) ABSTRACT

A device, method, and machine-readable medium program product for controlling a tape data storage drive are disclosed. According to one embodiment, a device is provided for controlling a tape drive operable with a tape storage medium, the device comprising a buffer memory and a first functional unit. In the described embodiment, the first functional unit is configured to identify a logical end of the tape storage medium utilizing first data specifying a quantity of data stored within the buffer memory and second data specifying a current data write position on the tape storage medium.

5 Claims, 10 Drawing Sheets

| RGN | WRAP | | | | | | | | | |
|---|---|---|---|---|---|---|---|---|---|---|
| | 0 | 1 | 2 | 3 | ····· | 59 | 60 | 61 | 62 | 63 |
| 0 | 0 | 0 | 0 | 0 | | 0 | 0 | 0 | 0 | 0 |
| 1 | 90 | 88 | 93 | 88 | | 93 | 88 | 93 | 88 | 93 |
| 2 | 96 | 96 | 96 | 96 | | 96 | 96 | 96 | 95 | 95 |
| 3 | 95 | 96 | 95 | 96 | | 95 | 96 | 95 | 96 | 96 |
| 4 | 96 | 96 | 95 | 96 | | 95 | 96 | 95 | 96 | 95 |
| 5 | 95 | 96 | 96 | 95 | | 96 | 96 | 96 | 88 | 95 |
| 6 | 96 | 96 | 95 | 96 | | 95 | 95 | 95 | 96 | 96 |
| 7 | 95 | 96 | 95 | 96 | | 95 | 96 | 95 | 96 | 95 |
| 8 | 95 | 96 | 95 | 96 | | 95 | 96 | 96 | 96 | 96 |
| 9 | 95 | 96 | 95 | 96 | | 95 | 96 | 95 | 96 | 95 |
| 10 | 95 | 96 | 95 | 95 | | 96 | 96 | 96 | 96 | 96 |
| 11 | 95 | 95 | 96 | 96 | | 95 | 95 | 95 | 88 | 95 |
| 12 | 96 | 96 | 95 | 88 | | 96 | 96 | 96 | 96 | 95 |
| 13 | 95 | 96 | 88 | 96 | | 95 | 96 | 95 | 96 | 95 |
| 120 | 96 | 96 | 96 | 97 | | 96 | 96 | 96 | 97 | 96 |
| 121 | 96 | 97 | 96 | 96 | | 96 | 96 | 96 | 96 | |
| 122 | 96 | 96 | 96 | 96 | | 96 | 96 | 96 | 96 | |
| 123 | 96 | 96 | 96 | 96 | | 96 | 97 | 96 | 96 | |
| 124 | 96 | 96 | 96 | 96 | | 96 | 96 | 96 | 95 | |
| 125 | 96 | 96 | 96 | 96 | | 96 | 96 | 97 | 97 | |
| 126 | 94 | 96 | 95 | 96 | | 94 | 96 | 94 | 96 | |
| 127 | 0 | 3 | 0 | 3 | | 0 | 3 | 0 | 3 | |

DEVICE, METHOD, AND PROGRAM PRODUCT FOR CONTROLLING A TAPE DATA STORAGE DRIVE

PRIORITY CLAIMS

The present application is a continuation of U.S. patent application Ser. No. 11/349,317, filed on Feb. 7, 2006, now U.S. Pat. No. 7,385,776, and entitled, "Device, Method, and Program Product for Controlling a Tape Data Storage Drive," and also claims the benefit of priority of Japanese Patent Application No. JP2005-032076 filed on Feb. 8, 2005, and entitled "Device for, Method of, and Program Product for, Controlling a Tape Drive," both of which are hereby incorporated by reference herein in entirety and for all purposes.

BACKGROUND

1. Technical Field

The present invention relates to a device and the like for controlling a tape drive which drives a tape storage medium. More specifically, the present invention relates to a device and the like which have the function of issuing notification of the approach of the end of a tape when the end is being approached.

2. Description of the Related Art

A tape drive which performs writing to and reading from a tape generally has the function of issuing notification of the fact that the end is being approached. The fact that the end of tape is being approached is notified, for example, as an error for a write command from a host computer (hereinafter referred to as a "host"). It should be noted that in this specification, the end of the tape is referred to as a PEOT (physical end of tape) and a position on the tape at which notification of the approach of the PEOT is issued is referred to as an LEOT (logical end of tape).

When such notification has been issued, the tape drive must record on the tape all data transmitted from the host by that time.

Generally, the tape drive has a large buffer memory in order to improve performance. Data transmitted from the host is temporarily stored in this buffer memory and then recorded on the tape. Accordingly, at the point in time when notification of the approach of the PEOT is issued, a space in which all data stored in the buffer memory can be recorded is left on the tape.

Heretofore, a capacity equivalent to the buffer size has been consistently employed as such a space. That is, the LEOT has been determined such that a space in which data of a volume equivalent to the buffer size is typically left before the PEOT.

As described above, in conventional technology, the LEOT is typically determined such that a space of uniform size is provided between the LEOT and PEOT if a tape. For example, a position approximately 15 m before the PEOT may be determined to be and indicated as the LEOT.

However, if the LEOT is uniformly determined as described above, there arises the problem that a recording area on the tape may be wasted which increases as the buffer memory size increases. In particular, the storage capacity of the tape is wasted where there is little data to be written from the buffer memory as will be described with reference to FIG. 11A.

Figure 11A:
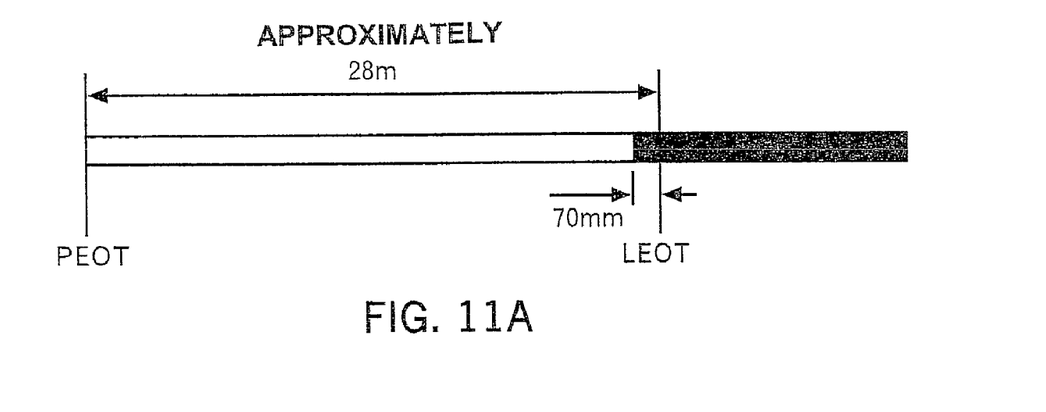
FIGS. 11A and 11B are diagrams depicting problems associated with conventional tape storage systems.

In FIG. 11A, it is assumed that the buffer memory has a capacity of 256 data sets and that the tape length per data set is 70 mm. In this case, a tape length for the case where all data sets in the buffer memory are recorded is 70 mm □ 256=approximately 18 m. Accordingly, the LEOT is set at a position approximately 28 m before the PEOT so that a margin of 10 m is left.

In FIG. 11A however, it is further assumed that only one data set is actually stored in the buffer memory. In this case, data is recorded only in a tape space indicated by the black strip portion in the drawing. Thus, a tape space indicated by the white strip portion is wasted.

Further, there are cases which are prevalent in conventional tape storage systems where data is recorded while areas having damage or the like on a tape are skipped, depending on standards for the format of the tape. For example, such data recording is permitted in systems implementing the Linear Tape-Open (LTO) standard, jointly-developed by International Business Machines (IBM) Corporation of Armonk, N.Y., Hewlett-Packard Corporation of Palo Alto, Calif., and Quantum Corporation of San Jose, Calif. (formerly Seagate Technology). In LTO, a skippable tape length is 4 m at the maximum. Accordingly, if the maximum skip is performed, the tape length per data set becomes 4 m. On the other hand, if a skip is not performed, the tape length per data set is only 70 mm.

In such circumstances, it is supposed that the occurrence of the need for skips in all data sets is very unlikely. Consequently, a tape length obtained by adding some space margin for the case where skips are assumed not to be performed is employed as a space to be left when the LEOT is determined. However, the frequency at which skips occur can increase more than is anticipated by the described space margin. Accordingly, there exists a risk inherent in using such a method of determining the LEOT that not all data sets in the buffer memory may be written to tape as will be described with reference to FIG. 11B.

Figure 11B:
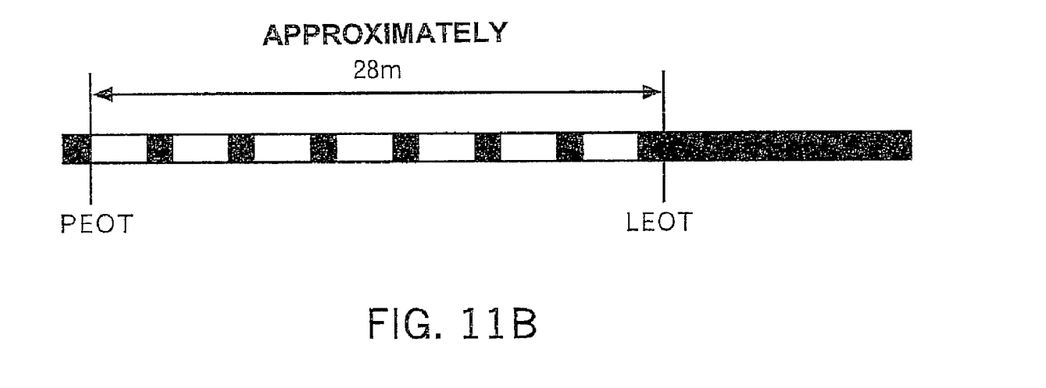

In FIG. 11B, the LEOT is also set at a position approximately 28 m before the PEOT based on a concept similar to that of FIG. 11A. However, if skips frequently occur as illustrated in the drawing, some data cannot be written as indicated by the black strip left of the PEOT.

BRIEF SUMMARY

A device, method, and machine-readable medium program product for controlling a tape data storage drive are provided herein. In one embodiment, a device is disclosed for controlling a tape drive operable with a tape storage medium, the device comprising a buffer memory and a first functional unit. In the described embodiment, the first functional unit is configured to identify a logical end of the tape storage medium utilizing first data specifying a quantity of data stored within the buffer memory and second data specifying a current data write position on the tape storage medium.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings is intended to indicate similar or identical items.

DETAILED DESCRIPTION OF AN
ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide the capability to identify the location of a LEOT at an appropriate position on a tape storage medium such that the tape storage medium is not wasted and the recordable area is not reduced unnecessarily.

In the present invention, in order to achieve the above-described objects, the timing of reporting an LEOT is dynamically changed using as an indicator the amount of data currently stored in a buffer memory. That is, a device of the present invention is a device for controlling a tape drive which drives a tape storage medium used for recording data. This device includes a buffer memory for temporarily storing the data, and means (e.g., one or more functional units) for identifying a LEOT by determining an output time of information concerning the approach of an end of the tape storage medium on the basis of the volume or "quantity" of data stored in the buffer memory and a current data write position on the tape storage medium. Thus, it is possible to reduce a loss of capacity which is caused by conventional systems which indicate the LEOT such that a space equivalent to the buffer memory size is left.

Further, embodiments of the present invention can also be configured such that a determination is made as to the possibility of the occurrence of a skip at the time of writing in a specific range on the tape in which recording is performed. In the described embodiment, such a determination is made in a reciprocating manner on the basis of the history of the number of data sets in the range at the time of reporting and with consideration given to the possibility of the occurrence of a skip as well as the amount of data to be actually recorded. In this case, embodiments of the present invention further include means for managing a recording condition of data on the tape storage medium. The determining means determines the LEOT indicator output time with consideration also given to the recording condition managed by the managing means. Thus, even in the case where a skip is very likely to occur, reporting the LEOT can be calculated to occur at an appropriate time.

Embodiments of the present invention can also be regarded as a method of determining the appropriate timing of reporting the LEOT. In an exemplary first method embodiment of the present invention, a method is provided for controlling a tape drive which drives a tape storage medium used for recording data. The first method includes storing the data in a buffer memory and identifying a LEOT utilizing first data specifying a quantity of data stored within the buffer memory and second data specifying a current data write position on the tape storage medium. In alternative embodiments, the identifying includes the acquisition of the quantity of data stored in the buffer memory, and the location of the current data write position on the tape storage medium. In another exemplary process embodiment of the present invention, a method is provided which further includes the extraction of a recording condition of data on the tape storage medium. The LEOT is then identified utilizing the recording condition as well as the buffer memory data quantity and the current data write position. Still other embodiments of the present invention can be regarded as a machine-readable medium having a program product encoded therein for performing methods or processes as previously described.

Figure 1:
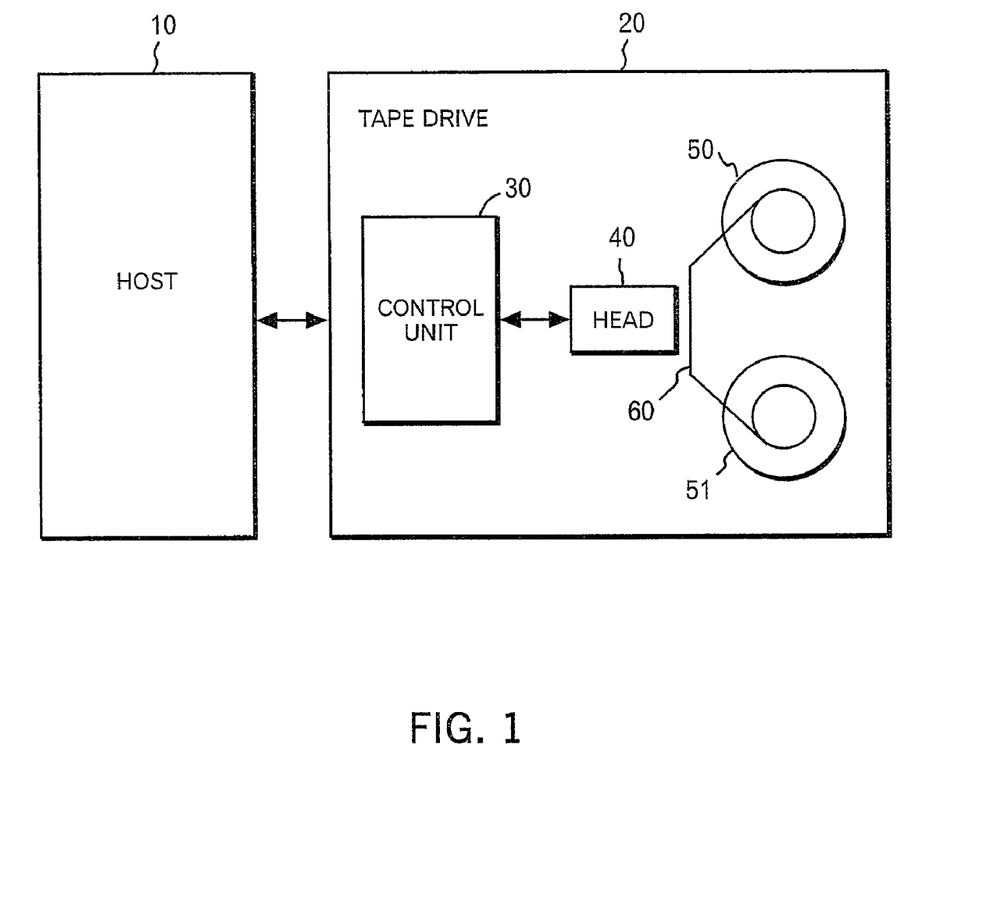
FIG. 1 is a block diagram illustrating the overall configuration of a computer system according to an embodiment of the present invention.

FIG. 1 is a block diagram illustrating the overall configuration of a computer system according to an embodiment of the present invention. This computer system includes a host 10 and a tape drive 20. In the depicted embodiment, host 10 is a general purpose computer such as a personal computer. That is, host 10 includes a central processing unit (CPU) for controlling the operation of the entire computer, and a main memory for storing programs and data directly accessed by the CPU. Host 10 may further include input devices such as a keyboard and/or mouse for inputting commands for processing, storing, or otherwise manipulating data, and an output device such as a display for displaying the result of such processing or manipulation.

In the embodiment of FIG. 1, tape drive 20 includes a control unit 30, a head 40, and reels 50 and 51. Further, a tape 60 is wound around reels 50 and 51 to be run therebetween. Head 40 is a mechanism for writing data to tape 60 and reading data from tape 60. Further, in this embodiment, tape 60 has a servo band in addition to a data band in which data is recorded. In the servo band, servo frames indicating positions in the longitudinal direction of tape 60 are recorded. Head 40 senses a current write position on tape 60 based on the servo frames.

Reels 50 and 51 constitute a mechanism in which reels 50 and 51 rotate to move tape 60 in the direction from reel 50 to reel 51 or in the direction from reel 51 to reel 50. Control unit 30 is a functional unit having a function of controlling the writing of data to tape 60 and reading of data from tape 60 in accordance with commands from host 10. While control unit 30 is depicted as a separate physical element within FIG. 1, it should be noted that in alternative embodiments of the present invention tape drive 20 includes a CPU and a main memory to implement control unit 30 (e.g., as a software or firmware module) similarly to host 10. In this embodiment, the control of control unit 30 makes it possible to set an LEOT at an appropriate position on the tape. Control unit 30 of the embodiment of FIG. 1 will be described in greater detail below herein.

Figure 2:
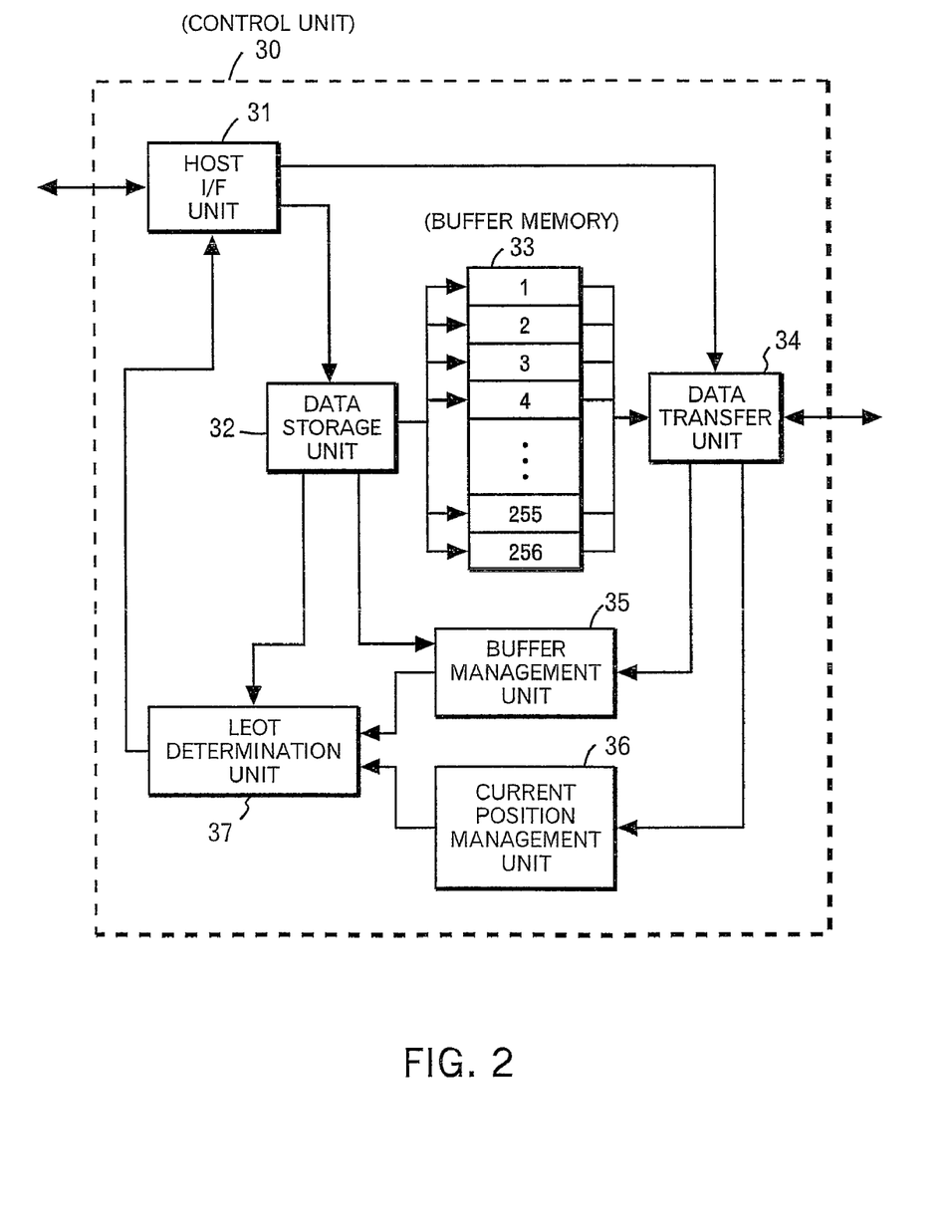
FIG. 2 is a block diagram illustrating the functional structure of a control unit according to a first embodiment of the present invention.

FIG. 2 is a block diagram illustrating the functional structure of a control unit (e.g., control unit 30) according to a first embodiment of the present invention. Control unit 30 of the embodiment of FIG. 2 comprises a plurality of functional units including a host interface unit (hereinafter referred to as a "host I/F unit") 31, a data storage unit 32, a buffer memory 33, and a data transfer unit 34. Control unit 30 further includes a buffer management unit 35, a current position management unit 36, and an LEOT determination unit 37.

Host I/F unit 31 receives data sets to be written to tape 60 from host 10, and issues notification of the LEOT to host 10 in response thereto. Data storage unit 32 in turn receives data sets from host I/F unit 31. Then, data storage unit 32 stores the data sets in a buffer memory (e.g., buffer memory 33) having the capacity to store some number (e.g., 256) of data sets. Conversely, data transfer unit 34 takes data stored in the buffer memory out and transfers data to head 40 in order to record the data on tape 60, and/or receives information (hereinafter referred to as "current position information") concerning a current write position on tape 60 from head 40.

Buffer management unit 35 manages the number of data sets stored in buffer memory 33. Current position management unit 36 receives current position information from data transfer unit 34 and manages the current position information. LEOT determination unit 37 checks information managed by buffer management unit 35 and information managed by current position management unit 36, thereby determining whether or not a current write position should be indicated as the LEOT. LEOT determination unit 37 is a section which can be considered as an identifying functional unit or "determination means" in terms of identifying or determining the LEOT.

In the depicted embodiment of FIG. 2, each functional unit described is realized via the cooperation of software and hardware resources. For example, the CPU of tape drive 20 loads programs for realizing functions of host I/F unit 31, data storage unit 32, data transfer unit 34, buffer management unit 35, current position management unit 36, and LEOT determination unit 37, into the main memory from a magnetic disk device or the like (not shown). Next, one example of the operation of control unit 30 will be described.

Figure 3:
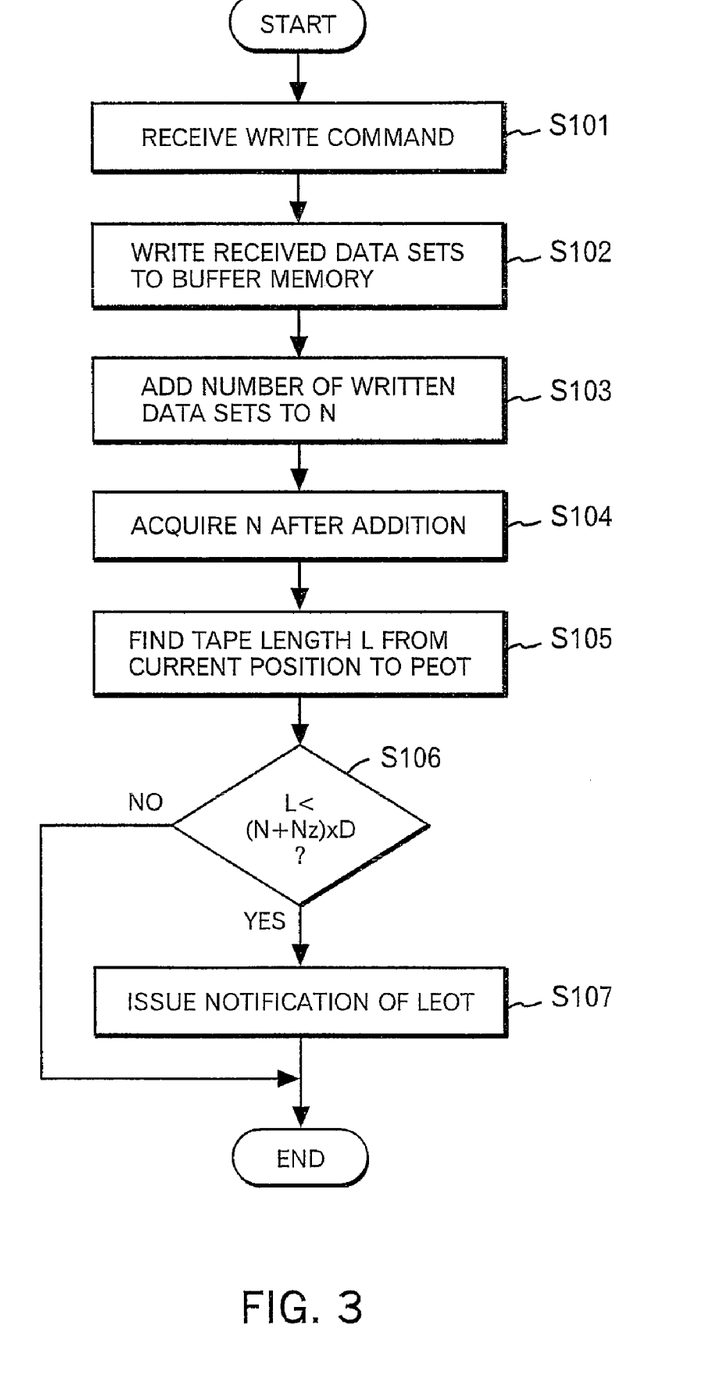
FIG. 3 is a flowchart illustrating the operation of a host I/F unit, a data storage unit, and an LEOT determination unit of the control unit according to the first embodiment of the present invention.

FIG. 3 is a flowchart illustrating the operation of a host I/F unit, a data storage unit, and an LEOT determination unit of a control unit (e.g., control unit 30) according to a first embodiment of the present invention. When a write command is transmitted from host 10 to tape drive 20, host I/F unit 31 first receives the write command (process block S101).

Next, data sets specified by the write command are passed to data storage unit 32, and stored in buffer memory 33 by data storage unit 32 (process block S102). Meanwhile, buffer management unit 35 maintains or "manages" the number N of data sets stored in buffer memory 33. Accordingly, data storage unit 32 directs buffer management unit 35 to add to N the number of data sets to be stored in buffer memory 33 at this time process block S103). As a result, the number of data sets currently stored in buffer memory 33 is reflected in the number N of data sets, which number is managed by buffer management unit 35.

Control is then passed from data storage unit 32 to LEOT determination unit 37 which acquires the value of N managed by buffer management unit 35 process block S104). Meanwhile, current position management unit 36 manages current position information. Accordingly, LEOT determination unit 37 finds the tape length L from a current write position to a PEOT based on the current position information (process block S105). Then, LEOT determination unit 37 determines whether or not to issue notification of or otherwise indicate the LEOT.

An identification of the LEOT (and determination as to whether or not to issue a notification thereof) is made in the process embodiment depicted in FIG. 3 utilizing a specific formula as will now be described in greater detail. First, in the case where N data sets are left in buffer memory 33, it is appropriate that a sufficient space to record the N data sets be left in the area from the current data write position to the PEOT. Accordingly, if the tape length per data set is denoted by D, it is appropriate that notification of the LEOT be issued when the tape length L from a current position to the PEOT has become N×D.

However, a point to notice here is that notification of the LEOT is provided in response to a write command. That is, after notification of the LEOT is issued to host 10, there is a possibility that data sets will be transferred from the host by a subsequent (i.e., "next") write command. Accordingly, it is necessary to determine whether or not to issue notification of the LEOT based on the relationship between the number of data sets in buffer memory 33 after the subsequent write command has been received and the current write data position on the tape. If it is assumed that one write command adds Nz data sets to buffer memory 33 at a maximum, notification of the LEOT is issued according to a formula utilized in the process embodiment of FIG. 3 when the tape length L from a current data write position to the PEOT has become (N+Nz)×D as will be described with reference to FIGS. 4A and 4B.

Figure 4A:
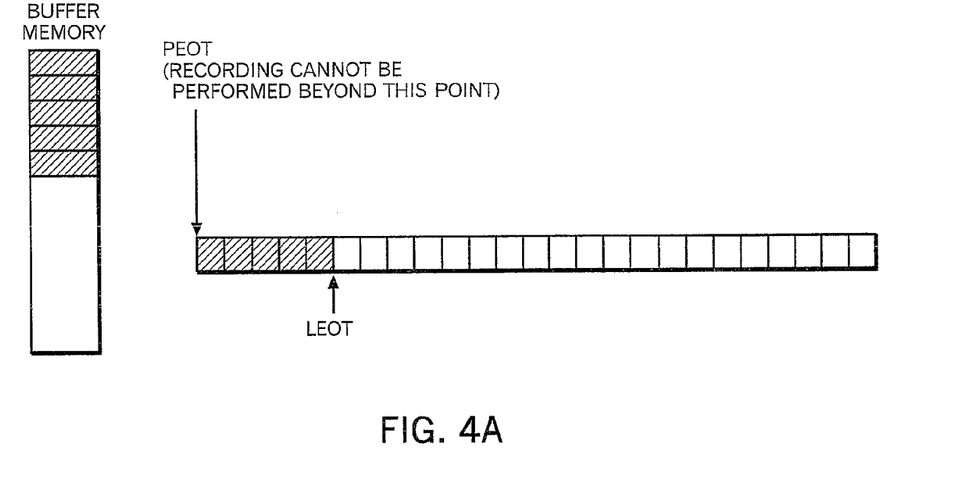
FIGS. 4A and 4B are diagrams depicting an LEOT determination method according to an embodiment of the present invention.

FIGS. 4A and 4B are diagrams depicting an LEOT determination method according to an embodiment of the present invention. FIG. 4A is a diagram illustrating the position of the LEOT for the case where no consideration is given to an increase in the number of data sets in buffer memory 33 due to the receipt of a write command after notification of the LEOT. Since five data sets (shaded portions) are left in buffer memory 33, sufficient space for recording these five data sets is provided before the PEOT as shown.

Figure 4B:
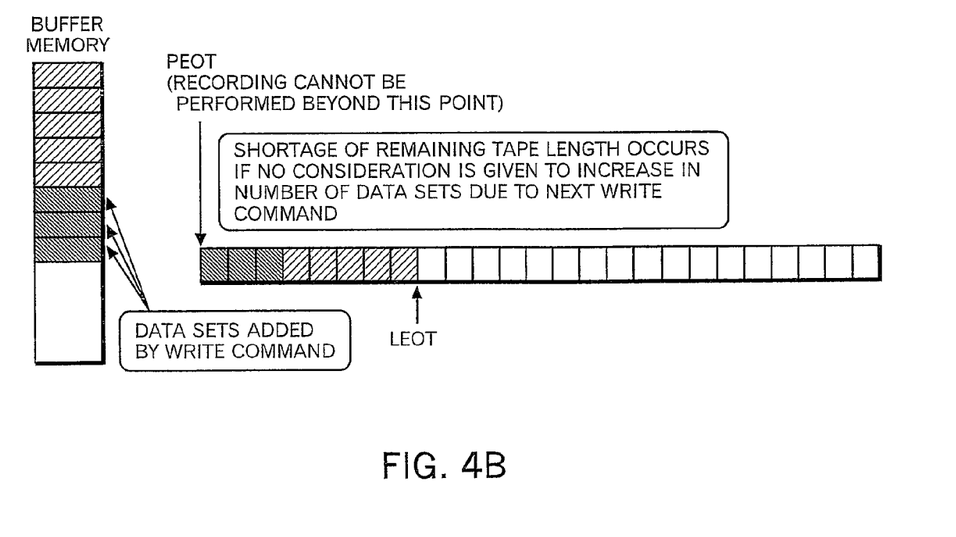

The embodiment of FIG. 4B illustrates however the position of the LEOT for the case where consideration is given to an increase in the number of data sets in buffer memory 33 due to a write command being received after notification of the LEOT. In this case, additional space is provided for the position of the LEOT as compared with the embodiment of FIG. 4A. This space is provided in order to record data sets added to buffer memory 33 by a write command which is received after notification of the LEOT. Here, it is assumed that three data sets (indicated by darker shaded portions) are added by such a subsequently-received write command. Sufficient space for recording three more data sets is provided as compared to the LEOT of FIG. 4A, and the position just before this total space is indicated as the LEOT.

With the position of the LEOT of FIG. 4A; data sets added to buffer memory 33 by a write command occurring subsequently to a notification of the LEOT cannot be recorded. However, with the position of the LEOT of FIG. 4B, even when data sets are added, a shortage of a recording area will not occur.

Accordingly, in one embodiment LEOT determination unit 37 determines whether or not L is smaller than (N+Nz)×D (process block S106). If L is determined to be smaller than (N+Nz)×D, notification of the LEOT is issued (process block S107). Otherwise, if L is determined not to be smaller than (N+Nz)×D, processing ends without issuing notification of the LEOT.

For example, it is assumed that the tape length D per data set is 70 mm and that the maximum number Nz of data sets stored in buffer memory 33 by one write command is 32. In this case, notification of the LEOT is issued when the tape length up to the PEOT has become (N+32)×70 (mm). In the above-described operation, data storage unit 32 stores data transferred from host 10 in buffer memory 33. In this state, actual writing to tape 60 has therefore not yet been performed. Accordingly, data transfer unit 34 takes out data sets stored in buffer memory 33 with predetermined timing and transfers the data sets to head 40.

It should be noted that, though various timings can be considered as the timing of the described transfer, the timing is not particularly limited in this embodiment. For example, data may be transferred with the timing at which the volume of data sets stored in buffer memory 33 reaches a certain ratio of the total capacity of buffer memory 33. Alternatively, data may be transferred when data transfer unit 34 is directed by host 10 to write all data sets stored in buffer memory 33 to tape 60.

Figure 5:
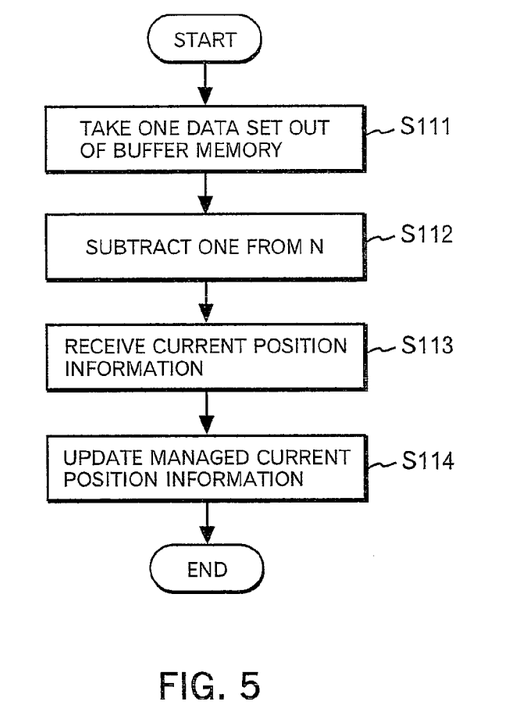
FIG. 5 is a flowchart illustrating the operation of a data transfer unit of the control unit according to the first embodiment of the present invention.

In any case, data transfer unit 34 performs such operation as illustrated in FIG. 5, though there may be differences in operation timing. FIG. 5 is a flowchart illustrating the operation of a data transfer unit of the control unit according to the first embodiment of the present invention. In the illustrated process embodiment, data transfer unit 34 takes a data set, which is a unit of writing to tape 60, out of buffer memory 33 and transfers the data set to head 40 (process block S111). Thus, head 40 actually writes this data set to tape 60.

At this time, data transfer unit 34 subtracts one from the number N of data sets in buffer memory 33, which number is managed by buffer management unit 35 (process block S112). Data transfer unit 34 also receives current position information from head 40 (process block S113). Then, data transfer unit 34 updates current position information managed by current position management unit 36 to a latest state (process block S114). That is, data transfer unit 34 always keeps information managed by buffer management unit 35 and current position management unit 36 up-to-date, thereby enabling LEOT determination unit 37 to determine the LEOT based on this latest information. Through the above-described operations, the process of the first embodiment ends.

It should be noted that the above-described LEOT determination method is merely one example. Various methods can be employed as a specific determination method as long as the LEOT is dynamically determined based on the volume of data stored in buffer memory 33.

Further, in this first embodiment, in the operation of control unit 30, no consideration is given to whether or not notification of the LEOT has already been issued. This is because it will be preferable that such an evaluation as illustrated in FIG. 3 is performed every time a write command is transferred from host 10 even after also conceivable in which control unit 30 stores information as to whether or not notification of the LEOT has already been issued and in which if the notification has already been issued, such an evaluation as illustrated in FIG. 3 is not performed.

As described above, in the first embodiment, the distance L from a current position on tape 60 to the start position of a non-recordable area (e.g., the PEOT) and (N+Nz)×D are compared every time processing based on a write command is completed, and notification of the LEOT is issued when the former becomes smaller than the latter. This makes it possible to determine an appropriate time of notification of the LEOT which reflects the amount of data left in buffer memory 33. This effect will now be further described using an exemplary set of specific numeric values.

For purposes of illustration, it will be assumed that buffer memory 33 can store 256 data sets of approximately 400 KB each and that each data set is recorded using 4 m of physical tape storage medium as a maximum permissible length for the format. That is, thought is given to the case where the maximum skip is performed in order to record one data set. In this case, the LEOT is at a distance of 1024 (=256×4) m from the PEOT.

If data sets have been neatly aligned and recorded in this range without any failure, 14628 (=1024×1000/70) data sets should be recorded with the tape length per data set assumed to be 70 mm. Accordingly, a loss of capacity is 5748 (=(14628−256)×0.4) MB.

Figure 6:
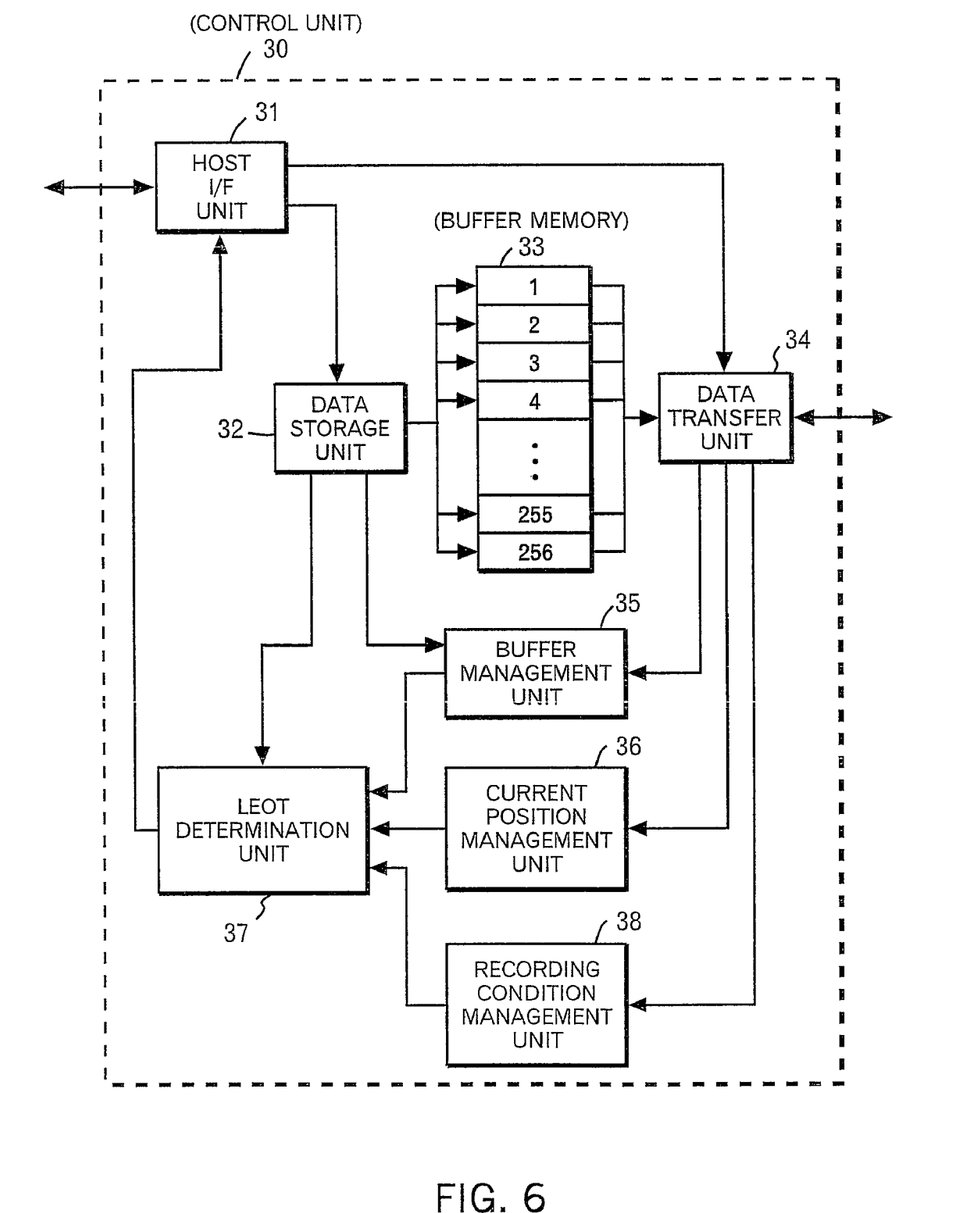
FIG. 6 is a block diagram illustrating the functional structure of a control unit according to a second embodiment of the present invention.

FIG. 6 is a block diagram illustrating the functional structure of a control unit (e.g., control unit 30) according to a second embodiment of the present invention. Control unit 30 has a configuration in which a recording condition management unit 38 is added as compared with the previously-described first embodiment.

Recording condition management unit 38 manages the recording condition of data on tape 60. Recording condition management unit 38 is a section which can be considered as management means in terms of managing a recording condition. Recording condition management unit 38 is also capable of being realized by a CPU of tape drive 20 loading a program for realizing functions of the unit into main memory from a magnetic disk device or the like (not shown).

It should be noted that in this embodiment, some other functions are added to the functions of head 40 and data transfer unit 34 as compared with the first embodiment in order to enable control unit 30 to manage a recording condition on tape 60. That is, added to head 40 is the function of writing a data set transferred from control unit 30 to tape 60 and then re-reading the written data set to return the data set to control unit 30. Similarly, added to data transfer unit 34 is the function of receiving the read data set from head 40 and verifying whether or not the received data set coincides with the data set designated for writing. In the first embodiment, a predetermined value has been used as the tape length D per data set. However, in this second embodiment, a tape length required to record one data set is found based on an actual recording condition.

In a linear tape drive, data is recorded by head 40 moving forward and backward on tape 60 a plurality of times. Accordingly, in many cases, if there is damage in tape 60, a skip for avoiding the damage is performed every time head 40 passes through the area thereof. In this embodiment, attention is paid to such operation, and a prediction is made as to how many data sets can be recorded in a certain area. That is, the number of data sets recorded inl the same area on tape 60 in the past is observed, and a prediction as to how many data sets can be recorded in the area is made based on the result of the observation as will be specifically described with reference to FIG. 7.

Figure 7:
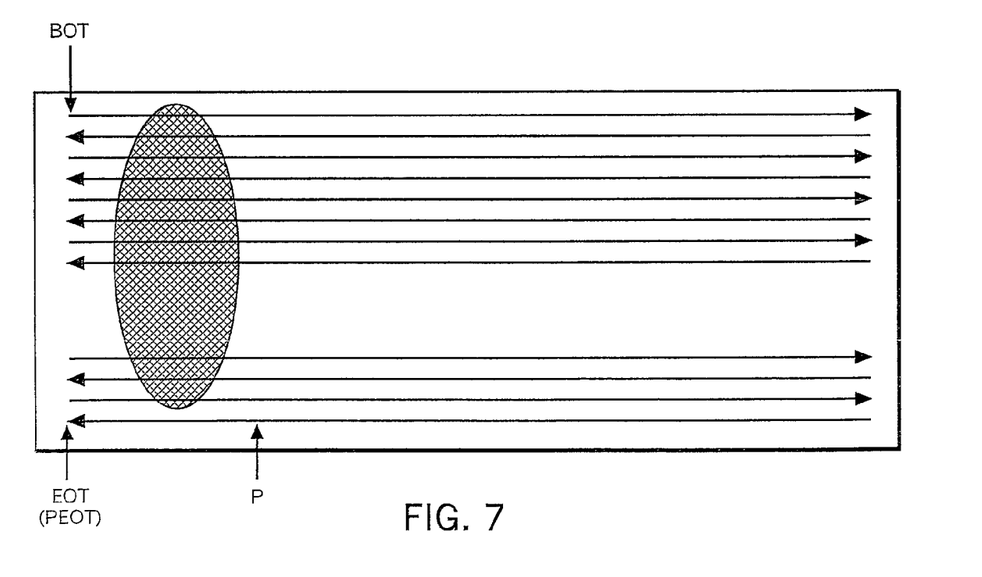
FIG. 7 is a diagram depicting a position on a tape which has a recording condition that is used when an LEOT is determined according to the second embodiment of the present invention.

FIG. 7 is a diagram depicting a position on a tape which has a recording condition that is used when an LEOT is determined according to the second embodiment of the present invention. For example, in LTO generation 2, a tape storage device head (e.g., head 40) moves forward and backward on a tape (e.g., tape 60) 32 times. In FIG. 7, the uppermost rightward arrow represents a first forward motion, and the leftward arrow thereunder represents a first backward motion. Further, the rightward arrow thereunder represents a second forward motion, and the leftward arrow thereunder represents a second backward motion. Subsequent motions are similarly represented by arrows. The lowest leftward arrow represents a 32nd backward motion. The end of this 32nd backward motion is the PEOT.

Thought is given to the case where whether or not to provide notification of the LEOT is determined when a current write position is at position P in this last backward motion. In this case, the tape length per data set is found based on the recording condition for the past 31.5 reciprocating motions in the area between position P and the PEOT on tape 60. That is, the recording condition in the portion indicated by the hashed oval in FIG. 7 is referred to. Accordingly, in this embodiment, recording condition management unit 38 extracts such information (e.g., a tape map) as illustrated in FIG. 8.

Figure 8:
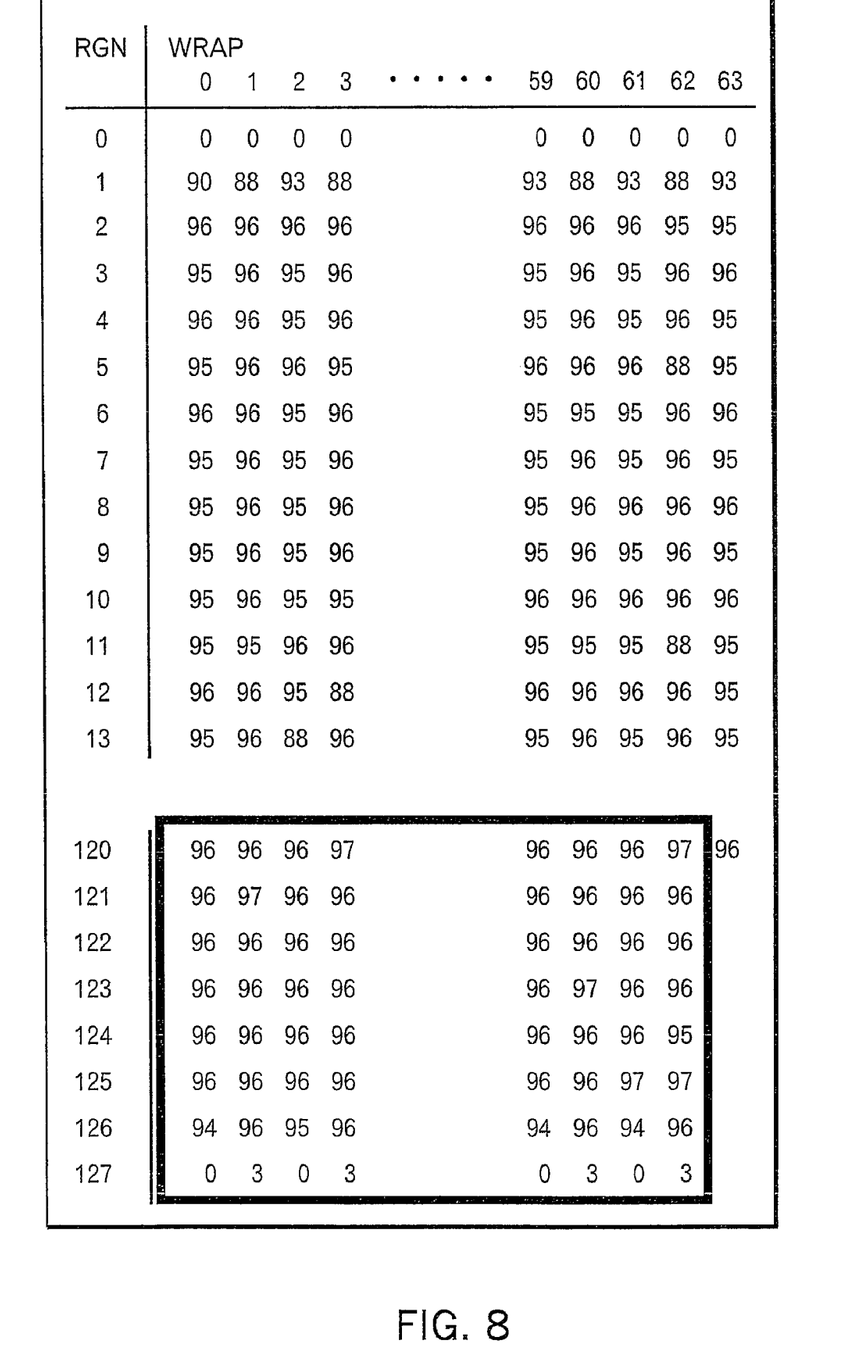
FIG. 8 is a view illustrating one example of information managed by a recording condition management unit according to the second embodiment of the present invention.

FIG. 8 is a view illustrating one example of information managed by a recording condition management unit according to the second embodiment of the present invention. In this drawing, the horizontal axis indicates a "wrap". A wrap within the present description is intended to indicate one way of the path of head 40 on tape 60. That is, in the case where head 40 moves forward and backward on tape 60 32 times, 64 wraps exist on tape 60. In this drawing, wraps are numbered 0 to 63. In the embodiment of FIG. 8, the vertical axis indicates a "region". A region within the present description is divided into 128 "regions", numbered 0 to 127. Further, the number of data sets which have been capable of being recorded in each region of each wrap is managed.

It should be noted that though even-numbered wraps connote forward motions and odd-numbered wraps connote backward motions, regions are numbered along the path in each wrap. That is, in the case of even-numbered wraps, region 0 is on the side (the left side in FIG. 7) where the beginning of the tape (BOT) and the end of the tape (EOT) exist, and region 127 is on the side (the right side in FIG. 7) where the BOT and the EOT do not exist. In the case of odd-numbered wraps by contrast, region 0 is on the side (the right side in FIG. 7) where the BOT and the EOT do not exist, and region 127 is on the side (the left side in FIG. 7) where the BOT and the EOT exist. Accordingly, a determination as to the location of the LEOT is generally made several regions before region 127 of wrap 63. For example, in the case where a determination as to the location of the LEOT is made in region 120 of wrap 63, the recording conditions of the portions surrounded by a rectangle in FIG. 8 are used. Specifically, the tape length per data set is found for each wrap from the recording condition in these portions, and the average value or the minimum value thereof is set as the tape length M per data set which is used to determine the LEOT as will be described in greater detail herein with respect to FIG. 9.

Figure 9:
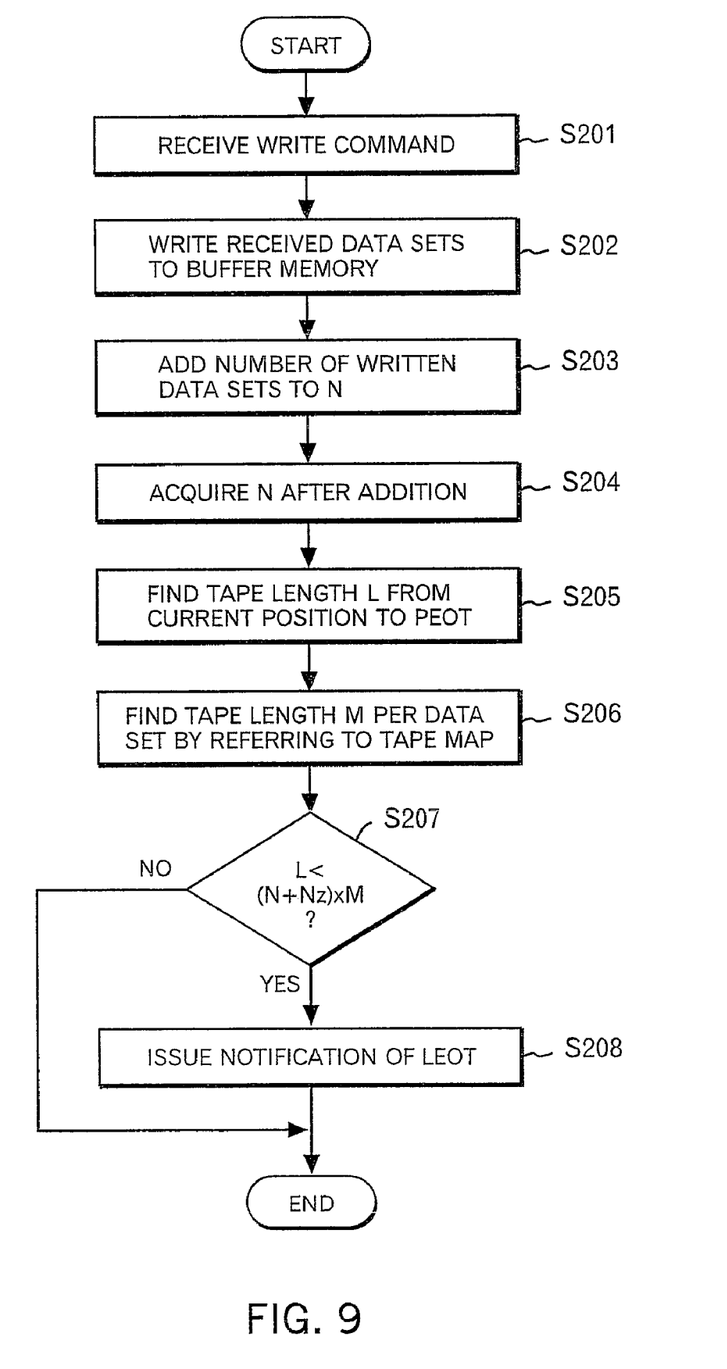
FIG. 9 is a flowchart illustrating the operation of a host I/F unit, a data storage unit, and an LEOT determination unit of the control unit according to the second embodiment of the present invention.

FIG. 9 is a flowchart illustrating the operation of a host I/F unit, a data storage unit, and an LEOT determination unit of the control unit according to the second embodiment of the present invention. When a write command is transmitted from host 10, host I/F unit 31 first receives the write command (process block S201).

Thereafter, data sets specified by the write command are transferred to data storage unit 32, and stored in buffer memory 33 by data storage unit 32 (process block S202). Meanwhile, buffer management unit 35 manages the number N of data sets stored in buffer memory 33. Accordingly, data storage unit 32 directs buffer management unit 35 to add to N the number of data sets to be stored in buffer memory 33 at this time (process block S203). As a result, the number of data sets currently stored in buffer memory 33 is also reflected in the number N of data sets, which number is managed by buffer management unit 35.

Control is then passed from data storage unit 32 to LEOT determination unit 37 which acquires the value of N managed by buffer management unit 35 (process block S204). Meanwhile, current position management unit 36 manages current position information. Accordingly, LEOT determination unit 37 finds the tape length L from a current write position to the PEOT based on the current position information (process block S205).

Further, in this embodiment, recording condition management unit 38 manages a tape map, which indicates the recording condition of tape 60. Accordingly, LEOT determination unit 37 finds the tape length M per data set by referring to this tape map (process block S206). Thereafter in the illustrated process embodiment, LEOT determination unit 37 determines whether or not to issue notification of the LEOT.

In the first embodiment, a predetermined fixed value D was used as the tape length per data set. However, in the embodiment depicted in FIG. 9, the tape length per data set M previously determined (process block S206) is used. That is, a determination is made as to whether or not the tape length L from the current position to the PEOT is smaller than (N+Nz)×M (process block S207).

If L is determined to be smaller than (N+Nz)×M notification of the LEOT is issued (process block S208). On the other hand, if L is determined not to be smaller than (N+Nz)×M, processing ends without issuing notification of the LEOT.

In the above-described operation, data storage unit 32 stores data transferred from host 10 in buffer memory 33. In this state, actual writing to tape 60 has therefore not yet been performed. Accordingly, data transfer unit 34 takes out data sets stored in buffer memory 33 with predetermined timing to transfer data sets to head 40. It should be noted that various timings can be considered as the timing of this transfer as described in the first embodiment.

Figure 10:
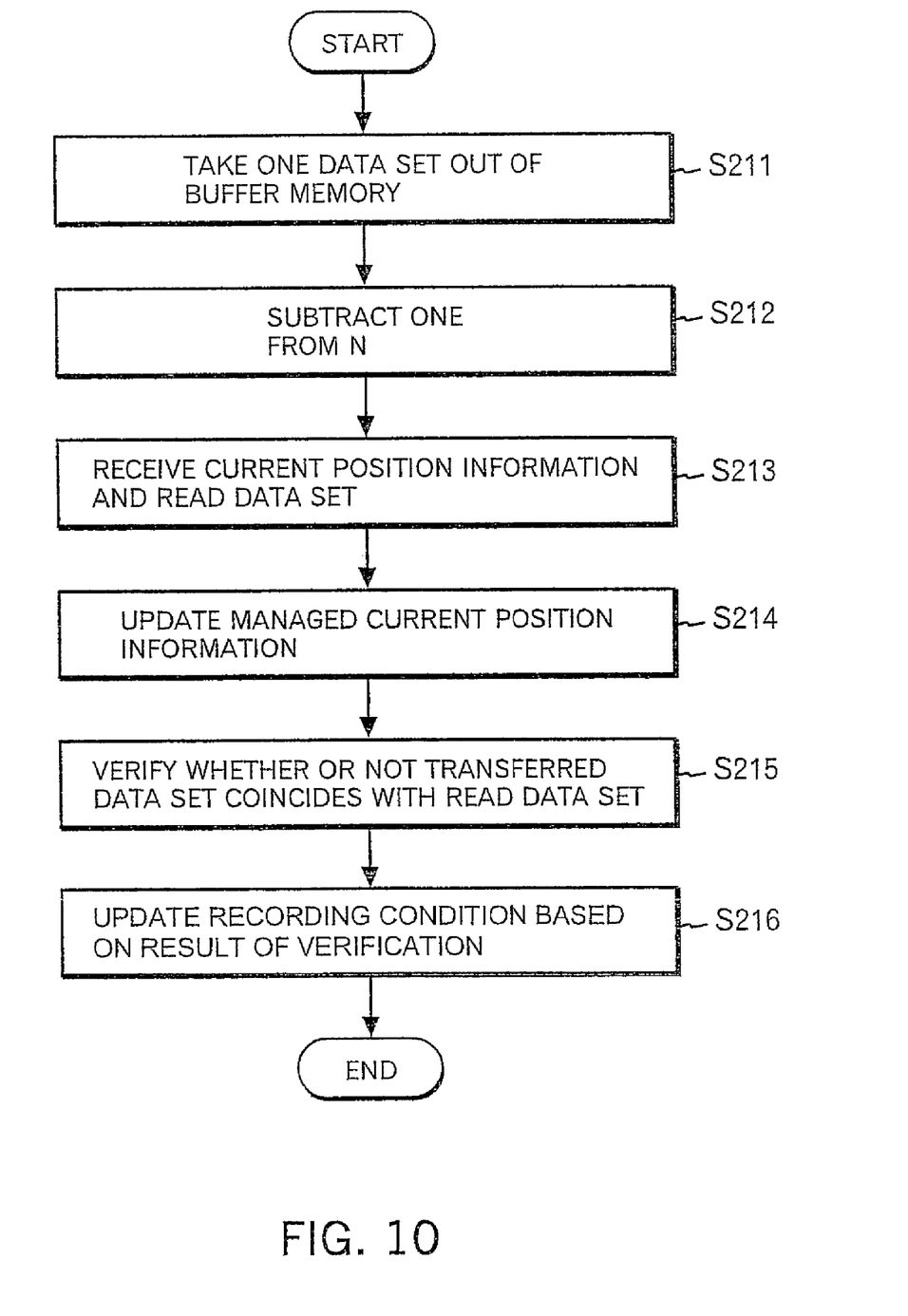
FIG. 10 is a flowchart illustrating the operation of a data transfer unit of the control unit according to the second embodiment of the present invention.

In any case, data transfer unit 34 performs such operation as illustrated in FIG. 10, though there may be differences in operation timing. FIG. 10 is a flowchart illustrating the operation of a data transfer unit of the control unit according to the second embodiment of the present invention. In the illustrated process embodiment, data transfer unit 34 takes a data set, which is a unit of writing to tape 60, out of buffer memory 33 and transfers the data set to head 40 (process block S211). Thus, head 40 actually writes this data set to tape 60.

At this time, data transfer unit 34 subtracts one from the number N of data sets in buffer memory 33, which number is managed by buffer management unit 35 (process block S212). Data transfer unit 34 also receives a current position information and data set from head 40 (process block S213). Then, data transfer unit 34 updates current position information managed by current position management unit 36 to a latest state (process block S214). Thereafter, data transfer unit 34 verifies whether or not the data set taken out of buffer memory 33 and transferred to head 40 coincides with the data set transferred from head 40 (process block S215). Further, data transfer unit 34 updates the recording state managed by recording condition management unit 38 based on the result of the verification (process block S216).

That is, data transfer unit 34 maintains up-to-date information managed by buffer management unit 35, current position management unit 36, and recording condition management unit 38, thereby enabling LEOT determination unit 37 to determine the LEOT based on this latest information. Through the above-described operations, the process of the second embodiment ends.

It should be noted that in this second embodiment, the LEOT is determined based on the recording condition of the same regions of other wraps. However, in the case where tape drive 20 uses different heads between forward and backward motions, investigations of recording condition may be limited to being performed on the same regions of wraps (e.g., 1, 3, . . . , 59, and 61) associated with backward motions. Further, in this case, it is also conceivable not to use recording condition in all wraps for backward motions but to selectively use recording condition of wraps near wrap 63.

In other embodiments of the present invention, it may also be effective to use an earlier recording condition of a current position in wrap 63. For example, there are cases where the accumulation of dust particulates on the recording head may cause failures in the recording of data. In such cases, it is considered that an immediately preceding recording condition in the same wrap will continue in the future.

Alternatively, the tape length M per data set may be found by considering both the recording condition of the same regions in other wraps and an immediately preceding recording condition in the same wrap.

The above-described LEOT determination method is merely one example. Various methods can be employed as a specific determination method as long as the LEOT is determined based on data as described herein (e.g., data specifying the volume of data stored in buffer memory 33 and the recording condition of data on tape 60).

Further, in the described second embodiment, in the operation of control unit 30, no consideration is given to whether or not notification of the LEOT has already been issued. This is because it will be preferable that such an evaluation as illustrated in FIG. 9 is performed every time a write command is transferred from host 10 even after notification of the LEOT has been issued to host 10. However, a modified example is also contemplated in alternative embodiments of the present invention in which control unit 30 stores information as to whether or not notification of the LEOT has already been issued and in which, if the notification has already been issued, such an evaluation as depicted in FIG. 9 is not performed.

As described above, in the second embodiment, the distance L from a current position on tape 60 to the start position of a non-recordable area (e.g., the PEOT) and the product (N+Nz)×M are compared each time processing based on a write command is completed. Based upon the described comparison, notification of the LEOT is issued when the former becomes smaller than the latter. This makes it possible to achieve an LEOT report at an appropriate time which reflects the amount of data left in buffer memory 33 and a prediction as to a skip when the data is written.

Embodiments of the present invention may include software, information processing hardware, and various processing operations further described herein. The features and process operations of various invention embodiments may be embodied in executable instructions embodied within a machine-readable medium such as memory, a storage device, a communication device or medium, or the like. A machine-readable medium may include any mechanism that provides (i.e., stores and/or transmits) data in a form readable by a machine.

For example, a machine-readable medium includes but is not limited to: optical storage media; flash memory devices; electrical, optical, and/or acoustical propagated signals (e.g., carrier waves, infrared signals, digital signals, etc.); or the like. The described executable instructions can be used to cause a general or special purpose processor, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

While the present invention has been described in the context of fully functional data processing system those skilled in the art will appreciate that the present invention is capable of being distributed as a machine-readable medium program product in a variety of forms and applies equally regardless of the particular type of machine-readable or signal-bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects. Consequently, the appended claims are to encompass within their scope all such changes and modifications as are within the true spirit and scope of this invention and embodiments of the invention are intended to be limited only by the scope of the appended claims, giving full cognizance to equivalents in all respects.

What is claimed is:

1. An apparatus for controlling a tape drive operable with a tape storage medium, said apparatus comprising:
    a buffer memory for storing data sets associated with write commands;
    a data storage unit for obtaining a total number N of data sets stored within said buffer memory;
    a current position management unit for obtaining a tape length L from a current write position on a tape storage medium to a physical end-of-tape (PEOT) of said tape storage medium; and
    a LEOT determination unit, coupled to said buffer memory, for determining whether or not there is enough space to write said total number N of data sets plus data sets from one additional write command within said tape length L, wherein said LEOT determination unit issues a logical end-of-tape (LEOT) notification in a determination that there is not enough space to write said total number N of data sets plus data sets from one additional write command within said tape length L.

2. The apparatus according to claim 1, wherein said LEOT determination unit subsequently writes said total number N of data sets plus data sets from one additional write command on said tape storage medium in a determination that there is enough space to write said total number N of data sets plus data sets from one additional write command within said tape length L.

3. The apparatus according to claim 1, wherein said LEOT determination unit further determines whether or not $(N+Nz) \times M$ is greater than L, wherein
    M is a tape length per data set, Nz is a maximum number of data sets that can be associated with said one additional write command, and $(N+Nz) \times M$ greater than L means that there is not enough space to write said total number N of data sets plus data sets from said one additional write command within said tape length L.

4. The apparatus according to claim 3, wherein said apparatus further includes a recording condition management unit for determining M by referring to a tape map.

5. The apparatus according to claim 1, wherein said one additional write command is issued after said obtaining said total number N or said tape length L.

* * * * *